United States Patent
Lee et al.

(10) Patent No.: US 12,038,849 B2
(45) Date of Patent: *Jul. 16, 2024

(54) METHOD FOR PERFORMING ACCESS MANAGEMENT IN A MEMORY DEVICE, ASSOCIATED MEMORY DEVICE AND CONTROLLER THEREOF, AND ASSOCIATED ELECTRONIC DEVICE

(71) Applicant: Silicon Motion, Inc., Hsinchu County (TW)

(72) Inventors: Jie-Hao Lee, Hsinchu County (TW); Cheng-Yu Yu, Changhua County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,576

(22) Filed: Jul. 5, 2023

(65) Prior Publication Data

US 2023/0342302 A1 Oct. 26, 2023

Related U.S. Application Data

(63) Continuation of application No. 18/078,098, filed on Dec. 9, 2022, now Pat. No. 11,741,016, which is a (Continued)

(51) Int. Cl.
*G06F 12/1009* (2016.01)
*G06F 3/06* (2006.01)
(Continued)

(52) U.S. Cl.
CPC ........ *G06F 12/1009* (2013.01); *G06F 3/0614* (2013.01); *G06F 3/0622* (2013.01);
(Continued)

(58) Field of Classification Search
CPC ............. G06F 12/1009; G06F 12/0246; G06F 12/1433; G06F 3/0614; G06F 3/0622;
(Continued)

(56) References Cited

U.S. PATENT DOCUMENTS

| | | |
|---|---|---|
| 6,105,103 A | 8/2000 | Courtright, II |
| 8,533,389 B1 | 9/2013 | Goyins |

(Continued)

FOREIGN PATENT DOCUMENTS

| | | |
|---|---|---|
| CN | 101739352 A | 6/2010 |
| CN | 102043728 A | 5/2011 |

(Continued)

OTHER PUBLICATIONS

Zhang, Jianquan, et al. "Application-aware and software-defined SSD scheme for tencent large-scale storage system." 2016 IEEE 22nd international conference on parallel and distributed systems (ICPADS). IEEE, 2016. (Year: 2016).*

(Continued)

*Primary Examiner* — Nicholas J Simonetti
(74) *Attorney, Agent, or Firm* — Winston Hsu

(57) ABSTRACT

A method for performing access management in a memory device, the associated memory device and the controller thereof, and the associated electronic device are provided. The method may include: receiving a host command and a logical address from a host device; performing at least one checking operation to obtain at least one checking result, for determining whether to load a logical-to-physical (L2P) table from the NV memory to a random access memory (RAM) of the memory device, wherein the L2P table includes address mapping information for accessing the target data, and performing the at least one checking operation to obtain at least one checking result includes checking whether a first L2P-table index pointing toward the L2P (Continued)

table and a second L2P-table index sent from the host device are equivalent to each other; and reading the target data from the NV memory, and sending the target data to the host device.

11 Claims, 6 Drawing Sheets

Related U.S. Application Data continuation of application No. 17/194,331, filed on Mar. 8, 2021, now Pat. No. 11,550,730, which is a continuation of application No. 15/859,747, filed on Jan. 2, 2018, now Pat. No. 10,977,187.

(60) Provisional application No. 62/568,797, filed on Oct. 6, 2017.

(51) Int. Cl.
*G06F 12/02* (2006.01)
*G06F 12/14* (2006.01)

(52) U.S. Cl.
CPC .......... *G06F 3/0631* (2013.01); *G06F 3/0659* (2013.01); *G06F 3/0679* (2013.01); *G06F 12/0246* (2013.01); *G06F 12/1433* (2013.01); *G06F 2212/1008* (2013.01); *G06F 2212/1052* (2013.01); *G06F 2212/205* (2013.01); *G06F 2212/657* (2013.01); *G06F 2212/7201* (2013.01)

(58) Field of Classification Search
CPC .... G06F 3/0631; G06F 3/0659; G06F 3/0679; G06F 2212/1008; G06F 2212/1052; G06F 2212/205; G06F 2212/657; G06F 2212/7201

See application file for complete search history.

(56) References Cited

U.S. PATENT DOCUMENTS

| | | |
|---|---|---|
| 8,838,937 B1 | 9/2014 | Katz |
| 8,874,850 B1 | 10/2014 | Goodson |
| 8,880,812 B1 | 11/2014 | Walch |
| 9,032,137 B2 | 5/2015 | Damle |
| 9,213,632 B1 | 12/2015 | Song |
| 9,645,925 B2 | 5/2017 | Lee |
| 10,482,009 B1* | 11/2019 | Sabol ................. G06F 12/0246 |
| 10,509,602 B2 | 12/2019 | Song |
| 11,544,183 B1 | 1/2023 | Kuzmin |
| 11,561,893 B2 | 1/2023 | Gorobets |
| 2007/0124531 A1 | 5/2007 | Nishihara |
| 2007/0208885 A1 | 9/2007 | Otsuka |
| 2008/0114939 A1 | 5/2008 | Mouton |
| 2009/0113121 A1 | 4/2009 | Lee |
| 2010/0005151 A1 | 1/2010 | Gokhale |
| 2010/0131805 A1 | 5/2010 | Katsuragi |
| 2011/0055475 A1 | 3/2011 | Takahashi |
| 2011/0145448 A1 | 6/2011 | Gordon |
| 2013/0238876 A1 | 9/2013 | Fiske |
| 2013/0262748 A1 | 10/2013 | Chang |
| 2013/0346675 A1 | 12/2013 | Yeh |
| 2014/0129761 A1 | 5/2014 | Kwon |
| 2015/0039814 A1 | 2/2015 | Lim |
| 2016/0147785 A1 | 5/2016 | Thirumal |
| 2016/0162416 A1 | 6/2016 | Boyd |
| 2017/0109089 A1 | 4/2017 | Huang |
| 2017/0228271 A1 | 8/2017 | Tsirkin |
| 2017/0235488 A1 | 8/2017 | Call |
| 2017/0300246 A1 | 10/2017 | Michaeli |
| 2017/0300422 A1 | 10/2017 | Szubbocsev |
| 2018/0074722 A1* | 3/2018 | Iwai ........................ G06F 21/00 |
| 2018/0275873 A1 | 9/2018 | Frid |
| 2018/0294952 A1 | 10/2018 | Yuan |
| 2019/0057038 A1 | 2/2019 | Haswell |

FOREIGN PATENT DOCUMENTS

| | | |
|---|---|---|
| CN | 103455432 A | 12/2013 |
| CN | 103914391 A | 7/2014 |
| CN | 103942114 A | 7/2014 |
| CN | 104102585 A | 10/2014 |
| CN | 105740157 A | 7/2016 |
| CN | 105989871 A | 10/2016 |
| CN | 106681653 A | 5/2017 |
| TW | I447583 B | 8/2014 |
| TW | I492050 B | 7/2015 |
| TW | I498902 B | 9/2015 |
| TW | I581181 B | 5/2017 |
| TW | 201729068 A | 8/2017 |
| TW | 201735050 A | 10/2017 |

OTHER PUBLICATIONS

Wei Mao et al., A Review of Storage Technology Research Based on Phase Change Memory, May 2015, p. 944-960, vol. 38 No. 5, Chinese Journal of Computers, Beijing, PROC. ,May 14, 2014.

Keith Au, et al., MiniRISC CW4001-A Small, Low-Power MIPS CPU Core, IEEE 1995 Custom Integrated Circuits Conference, p. 577-580. , 1995.

Yuanchao Xu, et al., A Survey on Security and Privacy of Emerging Non-Volatile Memory, 2016, p. 1930-1942, vol. 53 No. 9, Journal of Computer Research and Development, Beijing, PRC. ,Sep. 2016.

Qiuju Wang, Research and Implementation of Semantics about Relational Database Based on Ontology, Apr. 2014, A Thesis Submitted to Chongqing University in Partial Fulfillment of the Requirement for the Master's Degree of Engineering, College of Computer Science of Chongqing University, Chongqing, PRC. ,Apr. 2014.

Fan Ni et al., "A hash-based space-efficient page-level FTL for large-capacity SSDs", 2017 International Conference on Networking, Architecture, and Storage (NAS), 2017 IEEE. ,2017.

Doogie Lee et al., "MV-FTL: An FTL that provides page-level multi-version management", IEEE Transactions on Knowledge and Data Engineering, vol. 30, No. 1, Jan. 2018, 2017 IEEE, pp. 87-100. ,2017.

Tessier et al., "Power-efficient RAM mapping algorithms for FPGA embedded memory blocks", IEEE Transactions on Computer-Aided Design of Integrated Circuits and Systems, Feb. 2007, pp. 278-290, vol. 26, No. 2.

Hong et al., "A RAM cache approach using Host Memory Buffer of the NVMe interface", 2016 International SoC Design Conference (ISOCC), 2016, pp. 109-110.

* cited by examiner

METHOD FOR PERFORMING ACCESS MANAGEMENT IN A MEMORY DEVICE, ASSOCIATED MEMORY DEVICE AND CONTROLLER THEREOF, AND ASSOCIATED ELECTRONIC DEVICE

CROSS REFERENCE TO RELATED APPLICATIONS

This application is a continuation application of U.S. application Ser. No. 18/078,098, filed on Dec. 9, 2022, which is a continuation application of U.S. application Ser. No. 17/194,331, filed on Mar. 8, 2021, which is a continuation application of U.S. application Ser. No. 15/859,747, filed on Jan. 2, 2018, which claims the benefit of U.S. Provisional Application No. 62/568,797, filed on Oct. 6, 2017. The contents of these applications are incorporated herein by reference.

BACKGROUND OF THE INVENTION

1. Field of the Invention

The present invention is related to memory control, and more particularly, to a method and apparatus for performing access management in a memory device.

2. Description of the Prior Art

Developments in memory technology have led to the wide application of portable or non-portable memory devices, such as memory cards which conform to the SD/MMC, CF, MS and XD specifications, respectively, or embedded memory devices which conform to the UFS and EMMC specifications, respectively. Improving access control of memories in these memory devices remains an issue to be solved in the art.

NAND flash memories may comprise single level cell (SLC) and multiple level cell (MLC) flash memories. In an SLC flash memory, each transistor used as a memory cell may have any of two electrical charge values, respectively representing the logic values 0 and 1. The storage ability of each transistor used as a memory cell in an MLC flash memory may be fully utilized, where the transistor may be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

Compared with the SLC flash memory, the lower cost and larger capacity of the MLC flash memory means it is more likely to be applied in memory devices. The MLC flash memory does have instability issues, however. To ensure that access control of the flash memory in the memory device meets related specifications, a controller of the flash memory is usually configured to have management mechanisms to properly manage the access of data.

Related art memory devices with the above management mechanisms still have some disadvantages. For example, one of the memory devices may comprise a random access memory (RAM) for purposes of buffering, management, etc., and the storage capacity of the RAM is typically insufficient due to budget control. The related art tries to correct the problem, but further problems (e.g. side effects) may be introduced. Hence, there is a need for a novel memory access design having robust data access mechanism, to guarantee that a memory device can operate properly in various situations, respectively.

SUMMARY OF THE INVENTION

It is an objective of the present invention to provide a method for performing access management in a memory device, the associated memory device and the controller thereof, and the associated electronic device, in order to solve the above-mentioned problems.

It is another objective of the present invention to provide a method for performing access management in a memory device, the associated memory device and the controller thereof, and the associated electronic device, in order to guarantee that the memory device can operate properly in various situations, respectively.

It is yet another objective of the present invention to provide a method for performing access management in a memory device, the associated memory device and the controller thereof, and the associated electronic device, in order to solve the related art problems without introducing any side effect or in a way that is less likely to introduce a side effect.

At least one embodiment of the present invention provides a method for performing access management in a memory device. The memory device may comprise a non-volatile (NV) memory, and the NV memory may comprise at least one NV memory element (e.g. one or more NV memory elements). The method may comprise: receiving a host command and a logical address from a host device, wherein the host command is a read command, and a combination of the host command and the logical address is directed to a request of accessing target data corresponding to the logical address from the NV memory; with regard to the request of accessing the target data corresponding to the logical address from the NV memory, performing at least one checking operation to obtain at least one checking result, for determining whether to load a logical-to-physical (L2P) table from the NV memory to a random access memory (RAM) of the memory device, wherein the L2P table comprises address mapping information for accessing the target data, and performing the at least one checking operation to obtain at least one checking result comprises checking whether a first L2P-table index pointing toward the L2P table and a second L2P-table index sent from the host device are equivalent to each other; and reading the target data from the NV memory, and sending the target data to the host device.

In addition to the above method, the present invention also provides a memory device, and the memory device comprises a NV memory and a controller. The NV memory is arranged to store information, wherein the NV memory may comprise at least one NV memory element (e.g. one or more NV memory elements). The controller is coupled to the NV memory, and the controller is arranged to control operations of the memory device. In addition, the controller comprises a processing circuit that is arranged to control the controller according to a plurality of host commands from a host device, to allow the host device to access the NV memory through the controller. For example, the controller receives a host command and a logical address from the host device, wherein the host command is a read command, and a combination of the host command and the logical address is directed to a request of accessing target data corresponding to the logical address from the NV memory; with regard to the request of accessing the target data corresponding to the logical address from the NV memory, the controller performs at least one checking operation to obtain at least one checking result, for determining whether to load a logical-to-physical (L2P) table from the NV memory to a random access memory (RAM) of the memory device, wherein the L2P table comprises address mapping information for accessing the target data, and during performing the at least one checking operation to obtain at least one checking result, the controller checks whether a first L2P-table index pointing toward the L2P table and a second L2P-table index sent from the host device are equivalent to each other; and the controller reads the target data from the NV memory, and sends the target data to the host device.

According to some embodiments, an associated electronic device is also provided. The electronic device may comprise the above memory device, and may further comprise: the host device, coupled to the memory device. The host device may comprise: at least one processor, arranged for controlling operations of the host device; and a power supply circuit, coupled to the at least one processor, arranged for providing power to the at least one processor and the memory device. In addition, the memory device may provide the host device with storage space.

In addition to the above method, the present invention also provides a controller of a memory device, where the memory device comprises the controller and a NV memory. The NV memory may comprise at least one NV memory element (e.g. one or more NV memory elements). In addition, the controller comprises a processing circuit that is arranged to control the controller according to a plurality of host commands from a host device, to allow the host device to access the NV memory through the controller. For example, the controller receives a host command and a logical address from the host device, wherein the host command is a read command, and a combination of the host command and the logical address is directed to a request of accessing target data corresponding to the logical address from the NV memory; with regard to the request of accessing the target data corresponding to the logical address from the NV memory, the controller performs at least one checking operation to obtain at least one checking result, for determining whether to load a logical-to-physical (L2P) table from the NV memory to a random access memory (RAM) of the memory device, wherein the L2P table comprises address mapping information for accessing the target data, and during performing the at least one checking operation to obtain at least one checking result, the controller checks whether a first L2P-table index pointing toward the L2P table and a second L2P-table index sent from the host device are equivalent to each other; and the controller reads the target data from the NV memory, and sends the target data to the host device.

The present invention method and apparatus can guarantee that the memory device can operate properly in various situations, respectively. In addition, the present invention method and apparatus provide a robust data access mechanism. As a result, various goals such as optimal performance, high security, budget control, etc. can be achieved. Additionally, the present invention method and apparatus can solve the related art problems without introducing any side effect or in a way that is less likely to introduce a side effect.

These and other objectives of the present invention will no doubt become obvious to those of ordinary skill in the art after reading the following detailed description of the preferred embodiment that is illustrated in the various figures and drawings.

These and other objectives of the present invention will no doubt become obvious to those of ordinary skill in the art after reading the following detailed description of the preferred embodiment that is illustrated in the various figures and drawings.

DETAILED DESCRIPTION

I. The Memory System

Figure 1:
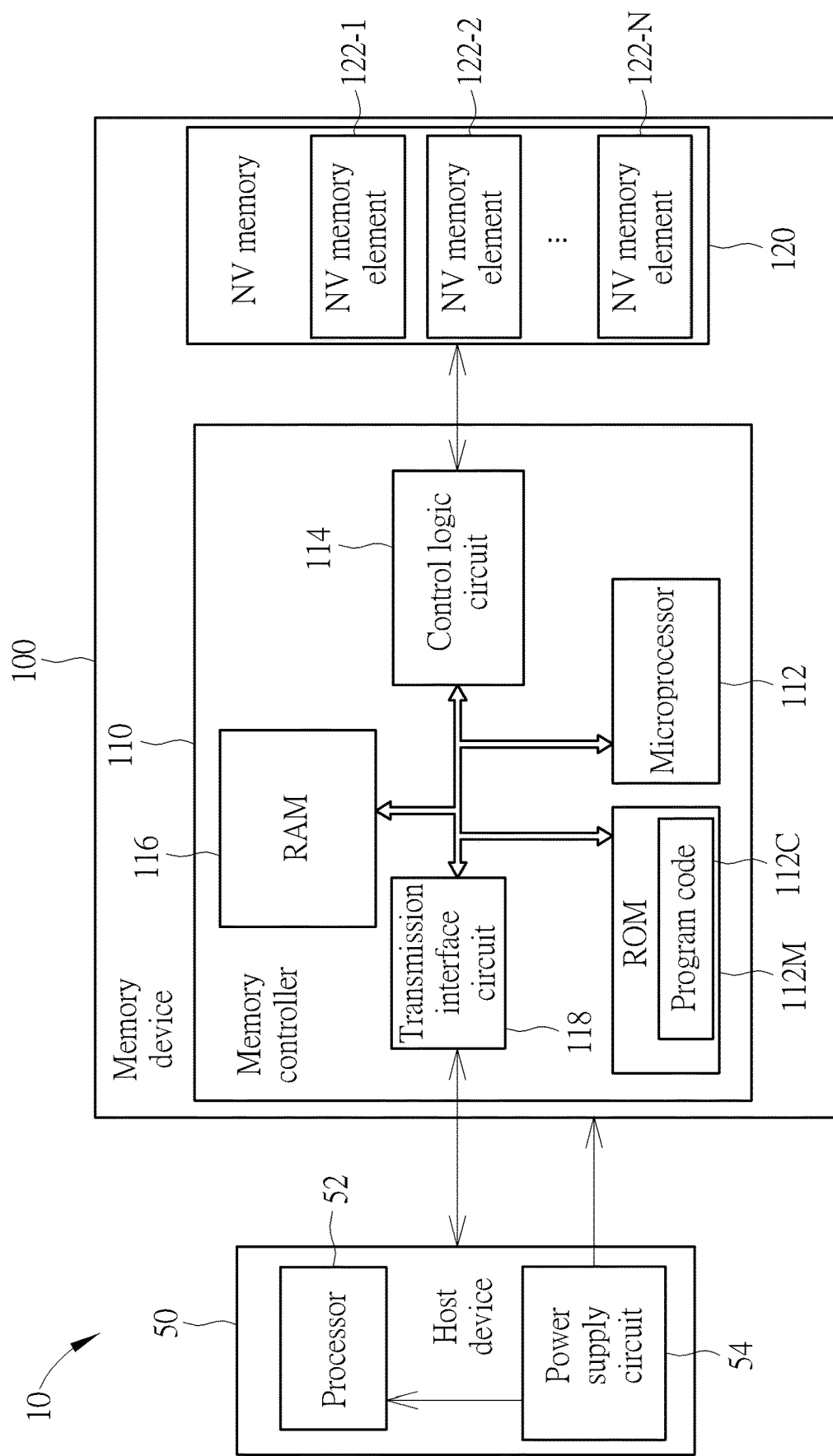
FIG. 1 is a diagram of a memory device and a host device according to an embodiment of the present invention.

FIG. 1 is a diagram of an electronic device 10 according to an embodiment of the present invention, where the electronic device 10 may comprise a host device 50 and a memory device 100. The host device 50 may comprise at least one processor (e.g. one or more processors) which may be collectively referred to as the processor 52, and may further comprise a power supply circuit 54 that is coupled to the processor 52. The processor 52 is arranged for controlling operations of the host device 50, and the power supply circuit 54 is arranged for providing power to the processor 52 and the memory device 100, and outputting one or more driving voltages to the memory device 100. The memory device 100 may be arranged for providing the host device 50 with storage space, and obtaining the one or more driving voltages from the host device 50 as power source of the memory device 100. Examples of the host device 50 may include, but are not limited to: a multifunctional mobile phone, a tablet, a wearable device, and a personal computer such as a desktop computer and a laptop computer. Examples of the memory device 100 may include, but are not limited to: a portable memory device (e.g. a memory card conforming to the SD/MMC, CF, MS or XD specification), a solid state drive (SSD), and various types of embedded memory devices conforming to the UFS and EMMC specifications, respectively. According to this embodiment, the memory device 100 may comprise a controller such as a memory controller 110, and may further comprise a non-volatile (NV) memory 120, where the controller is arranged to control operations of the memory device 100 and access the NV memory 120, and the NV memory 120 is arranged to store information. The NV memory 120 may comprise at least one NV memory element (e.g. one or more NV memory elements), such as a plurality of NV memory elements 122-1, 122-2, . . . , and 122-N, where "N" may represent a positive integer that is greater than one. For example, the NV memory 120 may be a flash memory, and the plurality of NV memory elements 122-1, 122-2, . . . , and 122-N may be a plurality of flash memory chips or a plurality of flash memory dies, but the present invention is not limited thereto.

As shown in FIG. 1, the memory controller 110 may comprise a processing circuit such as a microprocessor 112, a storage unit such as a read-only memory (ROM) 112M, a control logic circuit 114, a random access memory (RAM) 116, and a transmission interface circuit 118, where the above components may be coupled to one another via a bus. The RAM 116 is implemented by a Static RAM (SRAM), but the present invention is not limited thereto. The RAM 116 may be arranged to provide the memory controller 110 with internal storage space. For example, the RAM 116 may be utilized as a buffer memory for buffering data. In addition, the read-only memory 112M of this embodiment is arranged to store a program code 112C, and the microprocessor 112 is arranged to execute the program code 112C to control the access of the flash memory 120. Note that, in some examples, the program code 112C may be stored in the RAM 116 or any type of memory. Further, a data protection circuit (not shown) in the control logic circuit 114 may protect data and/or perform error correction, and the transmission interface circuit 118 may conform to a specific communications specification (e.g. the Serial Advanced Technology Attachment (SATA) specification, Universal Serial Bus (USB) specification, Peripheral Component Interconnect Express (PCIE) specification, embedded Multi Media Card (eMMC) specification, or Universal Flash Storage (UFS) specification), and may perform communications according to the specific communications specification.

In this embodiment, the host device 50 may transmit host commands and corresponding logical addresses to the memory controller 110 to access the memory device 100. The memory controller 110 receives the host commands and the logical addresses, and translates the host commands into memory operation commands (which may be simply referred to as operation commands), and further controls the NV memory 120 with the operation commands to perform reading, writing/programing or erasing upon the memory units (e.g. data pages) having physical addresses within the flash memory 120, where the physical addresses correspond to the logical addresses. When the memory controller 110 perform an erase operation on any NV memory element 122-n of the plurality of NV memory elements 122-1, 122-2, . . . , and 122-N (in which "n" may represent any integer in the interval [1, N]), at least one block of multiple blocks of the NV memory element 122-n may be erased, where each block of the blocks may comprise multiple pages (e.g. data pages), and an access operation (e.g. reading or writing) may be performed on one or more pages.

II. Data Access Mechanism

According to some embodiments, the processing circuit such as the microprocessor 112 may be arranged to control the memory controller 110 according to a plurality of host commands from the host device 50, to allow the host device 50 to access the NV memory 120 through the memory controller 110. The memory controller 110 may store data into the NV memory 120 for the host device 50, read the stored data in response to a host command (e.g. one of the plurality of host commands) from the host device 50, and provide the host device 50 with the data read from the NV memory 120. In order to enhance the performance of the memory device 100, the host device 50 may be designed to obtain some internal information of the memory device 100. The host device 50 may send back the internal information previously obtained from the memory device 100 toward the memory device 100, to allow the memory device 100 to use the internal information just sent from the host device 50, for accessing the stored data in the NV memory 120. As a result, the memory device 100 may utilize and share a RAM of the host device 50, since the internal information sent from the host device 50 may have been temporarily stored in the RAM of the host device 50. The memory controller 110 (e.g. the microprocessor 112 running the program code 112C) may control the operations of the memory device 100 according to the present invention method, to guarantee that the memory device 100 can operate properly in various situations, respectively. For example, the internal information sent from the host device 50 may be incorrect, and the memory controller 110 can detect this situation and prevent malfunction, etc. of the memory device 100. In another example, the information may be altered, and the memory controller 110 can detect this situation and prevent some security issues.

Figure 2:
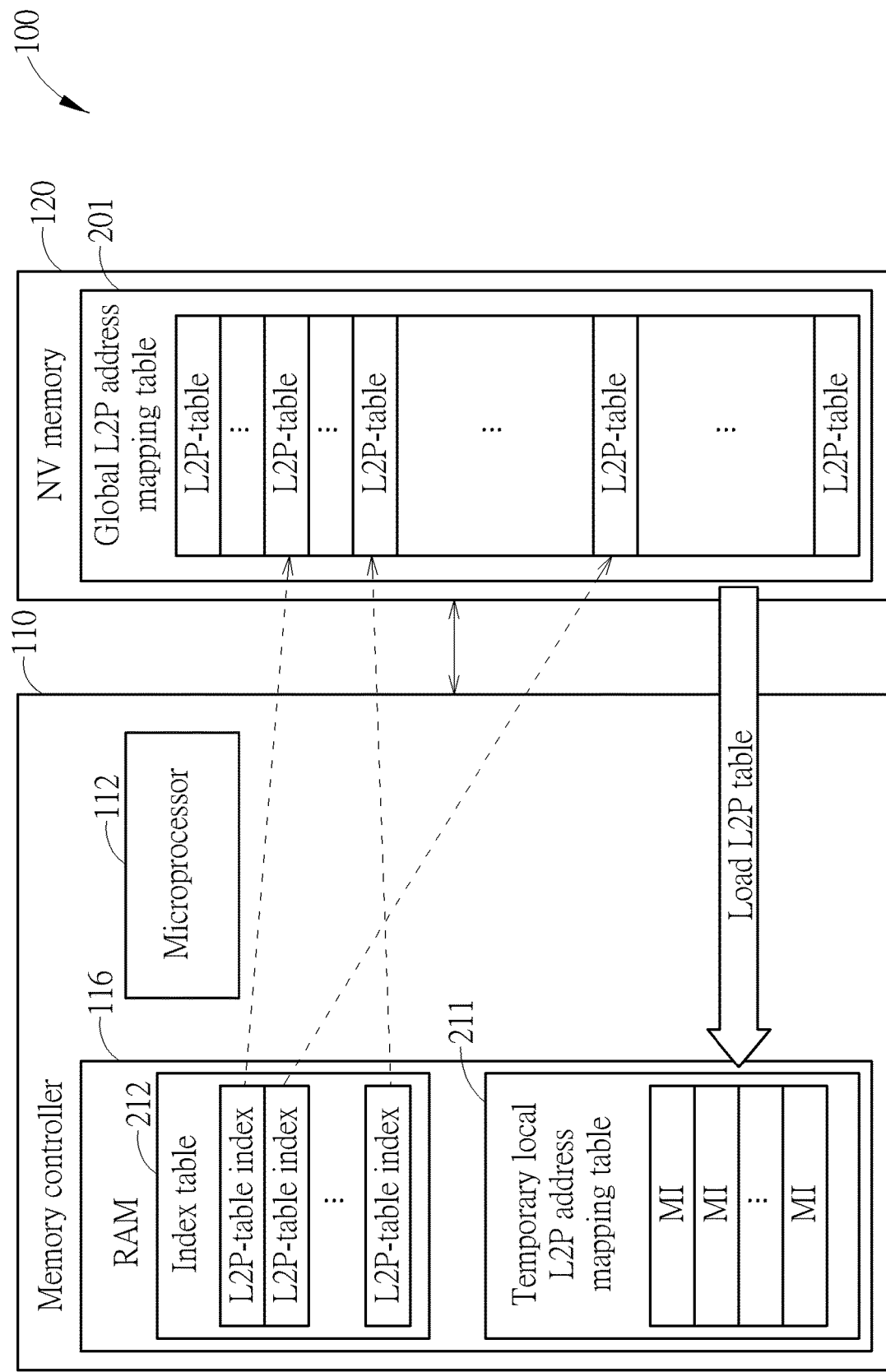
FIG. 2 illustrates an address mapping control scheme of a method for performing access management in a memory device such as that shown in FIG. 1 according to an embodiment of the present invention.

FIG. 2 illustrates an address mapping control scheme of a method for performing access management in a memory device such as that shown in FIG. 1 according to an embodiment of the present invention. Each of the NV memory elements 122-1, 122-2, . . . , and 122-N in the NV memory 120 may comprise a plurality of physical blocks, and each of the physical blocks may comprise a plurality of physical pages. Under control of the processing circuit such as the microprocessor 112, the memory controller 110 may store a global logical-to-physical (L2P) address mapping table 201 in the NV memory 120, and maintain (e.g. change and/or update) the global L2P address mapping table 201 according to the usage of the NV memory 120. The global L2P address mapping table 201 may comprise a plurality of local L2P address mapping tables (labeled "L2P table" in FIG. 2, for brevity), where a local L2P address mapping table may comprise multiple sets of L2P address mapping information for mapping logical addresses (e.g. addresses associated to host commands, for accessing data stored in the NV memory 120) to physical addresses (e.g. addresses pointing toward locations of stored data within the NV memory 120), respectively, and any set within the sets of L2P address mapping information may be mapping information (MI) for mapping a logical address of a host command to a physical address of the NV memory 120.

In addition, the memory controller 110 may store (e.g. load) at least one local L2P address mapping table (e.g. one or more local L2P address mapping tables) of the plurality of local L2P address mapping tables into the RAM 116 as the temporary local L2P address mapping table 211, and maintain (e.g. change and/or update) the temporary local L2P address mapping table 211 according to the usage of the NV memory 120. When needed, the memory controller 110 may update the global L2P address mapping table 201 according to the temporary local L2P address mapping table 211. For better comprehension, multiple boxes labeled "MI" may be illustrated in the temporary local L2P address mapping table 211 to represent multiple sets of L2P address mapping information therein, but the present invention is not limited thereto. For example, one set of these sets of L2P address mapping information may be the mapping information for mapping a first logical address to a first physical address. In another example, another set of these sets of L2P address mapping information may be the mapping information for mapping a second logical address to a second physical address. According to some embodiments, implementation of the sets of L2P address mapping information in the local L2P address mapping table may vary. For example, any set of the sets of L2P address mapping information in the local L2P address mapping table may comprise a physical address, and the ranking of the physical address among others of the physical addresses in the local L2P address mapping table may represent a logical address, but the present invention is not limited thereto. In another example, any set of the sets of L2P address mapping information in the local L2P address mapping table may comprise a logical address and a physical address.

Additionally, the memory controller 110 may store an index table 212 in the RAM 116, and maintain (e.g. change and/or update) the index table 212 according to the usage of the NV memory 120. The index table 212 may comprise a plurality of L2P-table indexes, and an L2P-table index of the plurality of L2P-table indexes may be an index for indexing an L2P table such as one of the plurality of local L2P address mapping tables. For example, the L2P-table index may be a physical address that points toward the location where the L2P table is stored (e.g. a physical page in a physical block), and the memory controller 110 may find the L2P table according to the L2P-table index.

According to some embodiments, the memory controller 110 may send a set of internal mapping information of the memory device 100 toward the host device 50, to allow the host device 50 to own the set of internal mapping information, for enhancing performance of the memory device 100. For example, the set of internal mapping information may comprise a copy of a set of local L2P address mapping tables within the plurality of local L2P address mapping tables, and may further comprise the L2P-table indexes of the set of local L2P address mapping tables, such as the L2P-table indexes pointing toward the locations where the set of local L2P address mapping tables are stored, respectively.

When the host device 50 sends a host command to access target data at a logical block address, the host device 50 may send the corresponding internal mapping information within the set of internal mapping information. The corresponding internal mapping information may comprise a local L2P address mapping table having the set of L2P address mapping information (e.g. the MI) of the logical block address, for a purpose of finding the physical block and the physical page storing the target data. The corresponding internal mapping information may further comprise the L2P-table index of this local L2P address mapping table, such as the L2P-table indexes pointing toward the location where this local L2P address mapping table is stored, for a purpose of checking the correctness of the corresponding internal mapping information (e.g. checking whether it is true that the corresponding internal mapping information is not out of date and that the corresponding internal mapping information is not altered for bad intention).

The memory controller 110 may check whether the L2P-table index within the corresponding internal mapping information is the same as that stored in the index table 212, to determine whether the corresponding internal mapping information is correct. When the L2P-table index within the corresponding internal mapping information is the same as that stored in the index table 212, the memory controller 110 determines that the corresponding internal mapping information is correct (which may indicate that the corresponding internal mapping information is not out of date and that the corresponding internal mapping information is not altered), and therefore the memory controller 110 may utilize this local L2P address mapping table as the reference for finding the target data; otherwise, the memory controller 110 determines that the corresponding internal mapping information is incorrect (which may indicate that the corresponding internal mapping information is out of date or that the corresponding internal mapping information is altered), and therefore the memory controller 110 may not utilize this local L2P address mapping table as the reference for finding the target data. For the case that the corresponding internal mapping information is incorrect, the memory controller 110 may utilize its own version of internal mapping information, such as the correct L2P-table index in the index table 212 and the local L2P address mapping table that is found through the correct L2P-table index in the index table 212.

Figure 3:
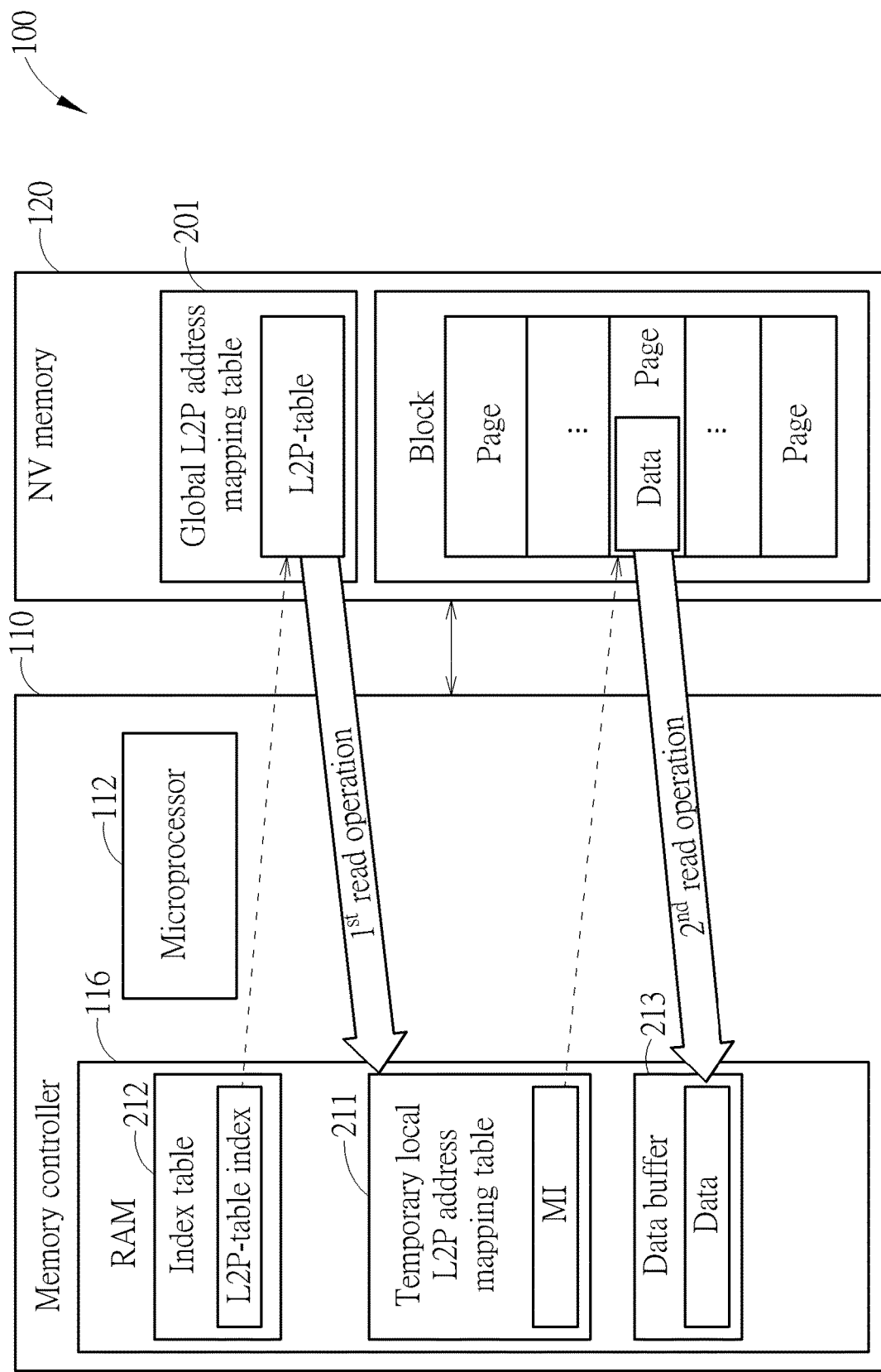
FIG. 3 illustrates a dual-read control scheme of the method for performing access management in the memory device according to an embodiment of the present invention.

FIG. 3 illustrates a dual-read control scheme of the aforementioned method for performing access management in the memory device such as that shown in FIG. 1 according to an embodiment of the present invention. The memory controller 110 may control the memory device 100 according to the dual-read control scheme in a situation where the corresponding internal mapping information is incorrect, but the present invention is not limited thereto. For example, the memory controller 110 may control the memory device 100 according to the dual-read control scheme in a situation where the memory controller 110 has not sent the set of internal mapping information of the memory device 100 toward the host device 50. For another example, the memory controller 110 may control the memory device 100 according to the dual-read control scheme when needed, no matter whether the memory controller 110 has sent the set of internal mapping information of the memory device 100 toward the host device 50.

For better comprehension, suppose that the corresponding internal mapping information is incorrect, and therefore the memory controller 110 may utilize its own version of internal mapping information, such as the correct L2P-table index in the index table 212 and the local L2P address mapping table (labeled "L2P table" in FIG. 3) that is found through the correct L2P-table index in the index table 212. For example, the memory controller 110 may read the local L2P address mapping table that is found through the correct L2P-table index in the index table 212, and this reading operation may be regarded as the first read operation (labeled "$1^{st}$ read operation" in FIG. 3) for accessing the target data. As a result of the first read operation, the temporary local L2P address mapping table 211 may comprise the set of L2P address mapping information (e.g. the MI) for finding the target data, such as the set of L2P address mapping information (e.g. the MI) that maps the logical address of the target data (e.g. the logical block address, etc. of the target data as indicated in the host command that asks for the target data) to the physical address (e.g. at least one physical address, such as the physical block address together with the page address indicating the physical page where the target data is stored). As shown in FIG. 3, the set of L2P address mapping information such as the MI pointing to one of the physical pages (labeled "Page") of the physical block (labeled "Block") indicates that the memory controller 110 can find the target data (labeled "Data") according to the set of L2P address mapping information (e.g. the MI). The memory controller 110 may read the target data from this physical page, and this reading operation may be regarded as the second read operation (labeled "$2^{nd}$ read operation" in FIG. 3) for accessing the target data. As a result of the second read operation, the data buffer 213 may comprise the target data (labeled "Data"), for being accessed by the host device 50. For example, the host device 50 may read the target data in the data buffer 213 through direct memory access (DMA).

According to some embodiments, the operation of loading the aforementioned at least one local L2P address mapping table (e.g. the one or more local L2P address mapping tables) of the plurality of local L2P address mapping tables into the RAM 116 as the temporary local L2P address mapping table 211 may comprise reading the local L2P address mapping table that is found through the correct L2P-table index in the index table 212.

Figure 4:
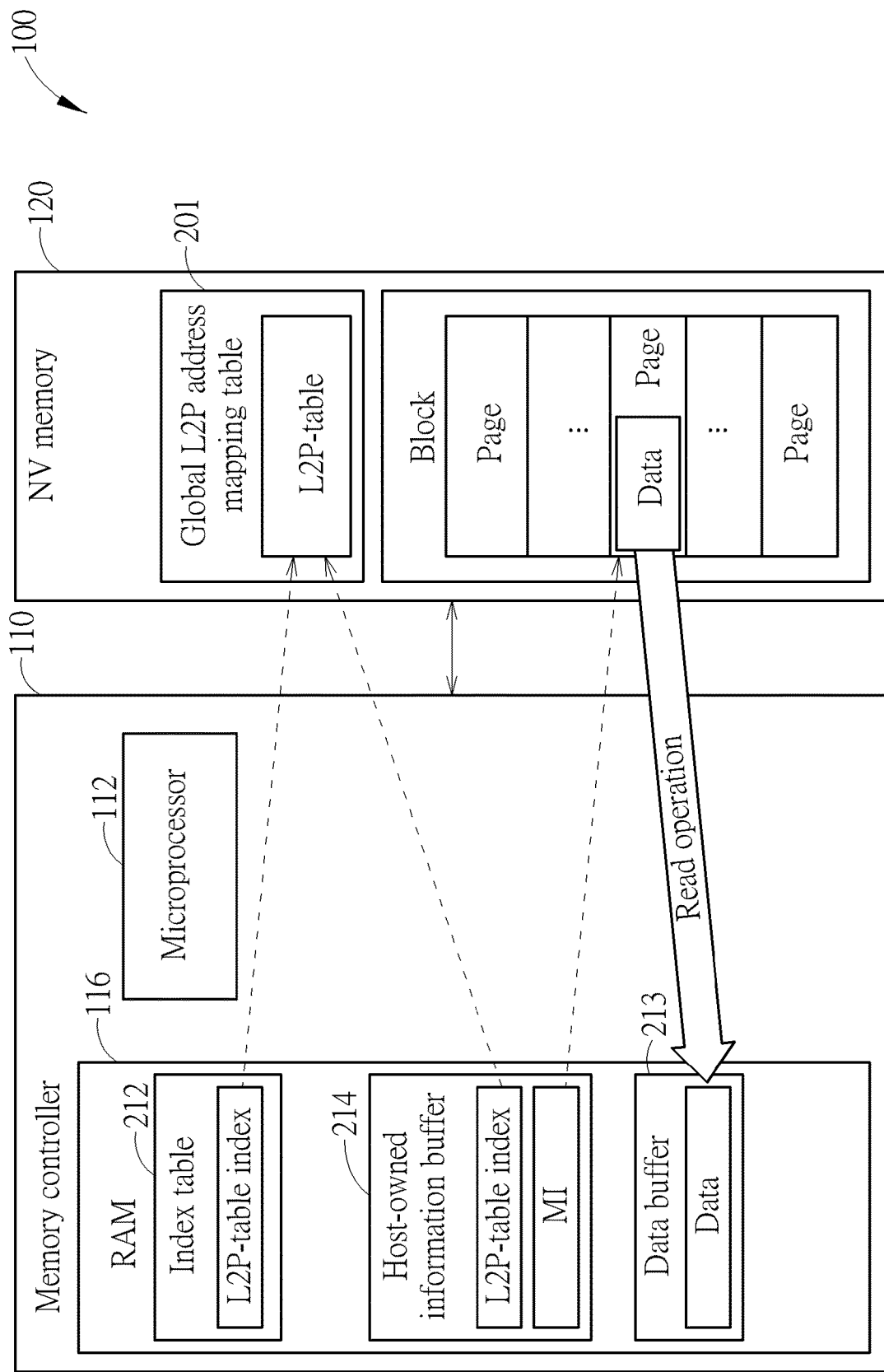
FIG. 4 illustrates a host-owned information (HOI) checking control scheme of the method for performing access management in the memory device according to an embodiment of the present invention.

FIG. 4 illustrates a host-owned information (HOI) checking control scheme of the method for performing access management in the memory device according to an embodiment of the present invention. As the memory controller 110 has sent the set of internal mapping information of the memory device 100 toward the host device 50, the set of internal mapping information in the host device 50 may be regarded as host-owned information (HOI). When sending a host command such as that mentioned above to access the target data, the host device 50 may send the set of L2P address mapping information (e.g. the MI) together with the L2P-table index, such as the combination of the set of L2P address mapping information (e.g. the MI) and the L2P-table index that is within the HOI. As a result, the memory device 100 may receive the set of L2P address mapping information (e.g. the MI) together with the L2P-table index, such as the combination of the set of L2P address mapping information (e.g. the MI) and the L2P-table index within the HOI, and may store them in the host-owned information (HOI) buffer 214.

The memory controller 110 may check whether the L2P-table index in the host-owned information buffer 214 is the same as the correct L2P-table index mentioned above (such as the L2P-table index in the index table 212 shown in FIG. 4), to determine whether to utilize the set of L2P address mapping information (e.g. the MI) in the host-owned information buffer 214 as the reference for accessing the target data. When the L2P-table index in the host-owned information buffer 214 is the same as the correct L2P-table index, the memory controller 110 may utilize the set of L2P address mapping information (e.g. the MI) in the host-owned information buffer 214 as the reference for accessing the target data; otherwise (which means the set of L2P address mapping information (e.g. the MI) in the host-owned information buffer 214 may be out of date or may be not reliable), the memory controller 110 may prevent utilizing the set of L2P address mapping information (e.g. the MI) in the host-owned information buffer 214 as the reference for accessing the target data, and may control the memory device 100 according to the dual-read control scheme shown in FIG. 3.

As shown in FIG. 4, both of the correct L2P-table index in the index table 212 and the L2P-table index in the host-owned information buffer 214 are pointing toward the same L2P address mapping table, since the L2P-table index in the host-owned information buffer 214 is the same as the correct L2P-table index. In this situation, the set of L2P address mapping information (e.g. the MI) in the host-owned information buffer 214 may be reliable and is not out of date. The memory controller 110 can find the target data (labeled "Data") according to the set of L2P address mapping information (e.g. the MI) in the host-owned information buffer 214. The memory controller 110 may read the target data from the physical page indicated by the set of L2P address mapping information (e.g. the MI) in the host-owned information buffer 214, and this reading operation may be regarded as the single read operation (labeled "Read operation" in FIG. 4) for accessing the target data. As a result of the single read operation, the data buffer 213 may comprise the target data (labeled "Data"), for being accessed by the host device 50. For example, the host device 50 may read the target data in the data buffer 213 through DMA.

Based on the HOI checking control scheme shown in FIG. 4, when the L2P-table index in the host-owned information buffer 214 is the same as the correct L2P-table index, the memory controller 110 may rapidly obtain the target data through the single read operation, which is much faster than multiple read operations (e.g. the first and the second read operations). As a result, the performance of the memory device 100 is enhanced, and the overall performance of the electronic device is enhanced.

In addition, the operation of checking whether the L2P-table index in the host-owned information buffer 214 is the same as the correct L2P-table index may prevent the memory device 100 from obtaining wrong data (e.g. old data or invalid data) from the NV memory 120 for the host device 50. Therefore, the HOI checking control scheme shown in FIG. 4 may guarantee that the corresponding internal mapping information is not out of date and that the corresponding internal mapping information is not altered for bad intention. Additionally, the probability of the occurrence of memory system error due to wrong data may be greatly reduced.

Figure 5:
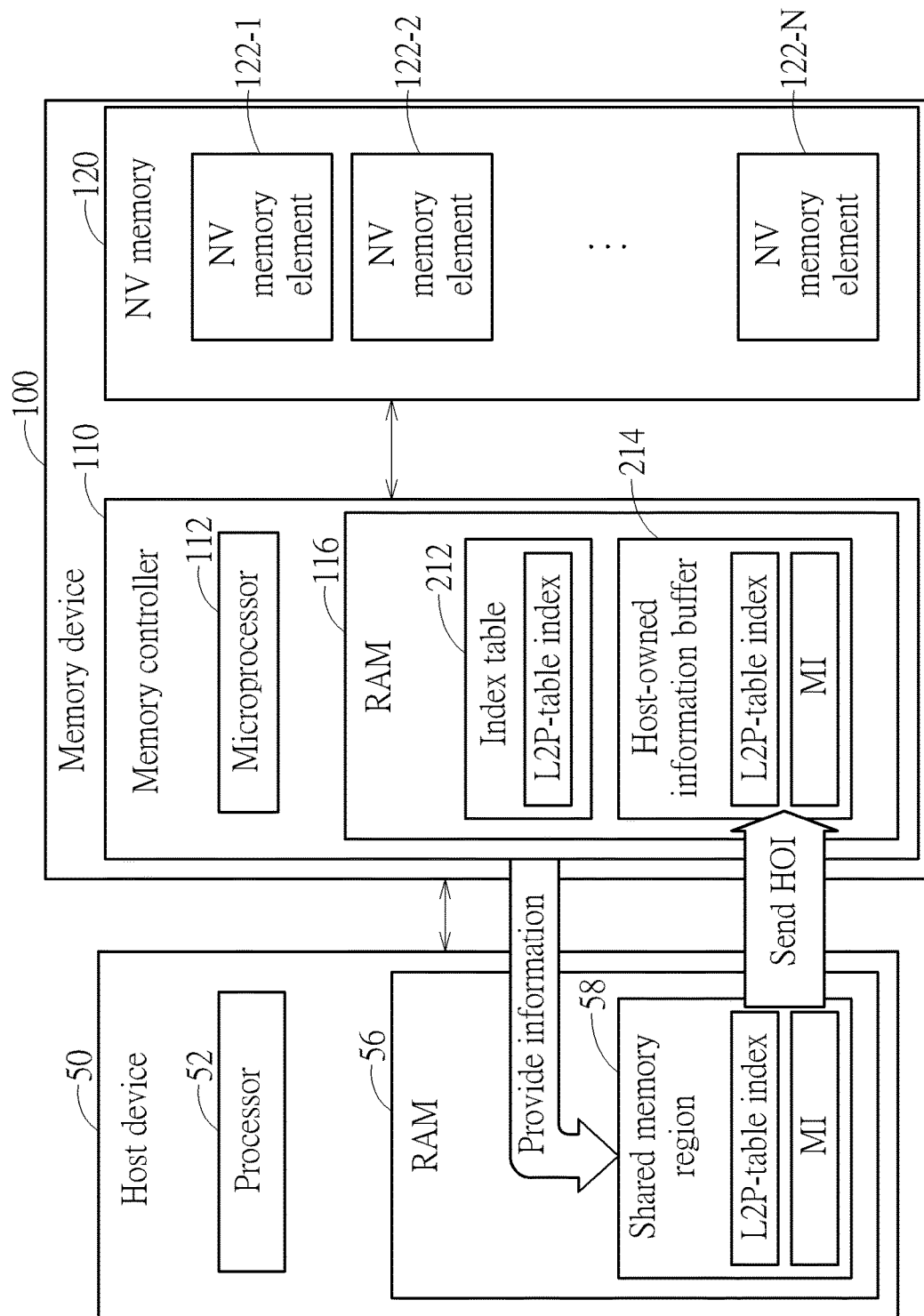
FIG. 5 illustrates a random access memory (RAM)-sharing control scheme of the method for performing access management in the memory device according to an embodiment of the present invention.

FIG. 5 illustrates a random access memory (RAM)-sharing control scheme of the method for performing access management in the memory device according to an embodiment of the present invention. According to this embodiment, the host device 50 may comprise at least one processor (e.g. one or more processors) such as the processor 52, and may comprise a RAM 56, where the RAM 56 may comprise a shared memory region 58. The memory controller 110 may provide information such as the set of internal mapping information to the host device 50, and the host device 50 may send at least one portion (e.g. a portion or all) of the HOI toward the memory device 100 when asking for the target data (e.g. by sending the host command such as a read command). For example, the aforementioned at least one portion of the HOI may comprise the set of L2P address mapping information (e.g. the MI) together with the L2P-table index, such as the combination of the set of L2P address mapping information (e.g. the MI) and the L2P-table index that is within the HOI. When the combination of the set of L2P address mapping information (e.g. the MI) and the L2P-table index that is within the HOI is correct and is not out of date, the memory controller 110 may control the memory device 100 according to the HOI checking control scheme shown in FIG. 4 (rather than the dual-read control scheme shown in FIG. 3), to obtain the target data through the single read operation (labeled "Read operation" in FIG. 4).

Based on various control schemes of the present invention method, such as the dual-read control scheme shown in FIG. 3, the HOI checking control scheme shown in FIG. 4, and the RAM-sharing control scheme shown in FIG. 5, when the storage capacity of the RAM 116 is insufficient (e.g. due to a limited budget design, a cost-down design, etc.), the present invention method and the associated architecture can solve the related art problems without introducing any side effect or in a way that is less likely to introduce a side effect.

TABLE 1

| L2P_Table (1) | B:5, P:3 |
|---|---|
| L2P_Table (2) | B:5, P:4 |
| L2P_Table (3) | B:5, P:5 |

TABLE 1-continued

| | |
|---|---|
| L2P_Table (4) | B:5, P:6 |
| L2P_Table (5) | B:5, P:7 |
| ... | ... |

TABLE 2

| | |
|---|---|
| LBA (NL) | B:6, P:0 |
| LBA (NL + 1) | B:6, P:1 |
| LBA (NL + 2) | B:6, P:2 |
| LBA (NL + 3) | B:6, P:3 |
| LBA (NL + 4) | B:6, P:4 |
| ... | ... |

Table 1 illustrates an example of the index table 212, and the notation " . . . " indicates that some table contents may be omitted for brevity. The L2P-table indexes {{B:5, P:3}, {B:5, P:4}, {B3:5, P:5}, {B:5, P:6}, {B3:5, P:7}, . . . } in the second column of Table 1 can be taken as an example of the plurality of L2P-table indexes, where the notation "B:" may indicate that the number next to it is a block index of a physical block, and the notation "P:" may indicate that the number next to it is a page index of a physical page. The memory controller 110 can find the L2P tables L2P_Table (1), L2P_Table(2), L2P_Table(3), L2P_Table(4), L2P_Table (5), etc. (such as that listed in the first column of Table 1) with aid of the L2P-table indexes {B:5, P:3}, {B:5, P:4}, {B:5, P:5}, {B:5, P:6}, {B:5, P:7}, etc. in the second column of Table 1, respectively.

Table 2 illustrates an example of the L2P table L2P_Table (1), and the notation " . . . " indicates that some table contents may be omitted for brevity. The mapping information {{B:6, P:0}, {B:6, P:1}, {B:6, P:2}, {B:6, P:3}, {B:6, P:4}, . . . } in the second column of Table 2 can be taken as an example of the mapping information (MI) in the L2P table L2P_Table(1), where the notation "B:" may indicate that the number next to it is a block index of a physical block, and the notation "P:" may indicate that the number next to it is a page index of a physical page. The memory controller 110 can find the data of the logical addresses LBA(NL), LBA(NL+1), LBA(NL+2), LBA(NL+3), LBA (NL+4), etc. (such as that listed in the first column of Table 2) with aid of the mapping information {B:6, P:0}, {B:6, P:1}, {B:6, P:2}, {B:6, P:3}, {B:6, P:4}, etc. in the second column of Table 2, respectively.

At a first time point, the memory controller 110 may have stored the L2P table L2P_Table(1) in the physical page PAGE(3) of the physical block BLOCK(5) as indicated by the L2P-table index {B:5, P:3}, and may send the set of internal mapping information, including the combination of the mapping information {B:6, P:0} and the L2P-table index {B:5, P:3}, toward the host device 50.

TABLE 3

| | | |
|---|---|---|
| LBA (NL) | B:5, P:3 | B:6, P:0 |

TABLE 4

| | |
|---|---|
| L2P_Table (1) | B:5, P:8 |
| L2P_Table (2) | B:5, P:4 |
| L2P_Table (3) | B:5, P:5 |

TABLE 4-continued

| | |
|---|---|
| L2P_Table (4) | B:5, P:6 |
| L2P_Table (5) | B:5, P:7 |
| ... | ... |

TABLE 5

| | |
|---|---|
| LBA (NL) | B:6, P:5 |
| LBA (NL + 1) | B:6, P:1 |
| LBA (NL + 2) | B:6, P:2 |
| LBA (NL + 3) | B:6, P:3 |
| LBA (NL + 4) | B:6, P:4 |
| ... | ... |

Table 3 illustrates an example of the combination of the mapping information {B:6, P:0} and the L2P-table index {B:5, P:3} that is sent toward the host device 50 at the first time point, Table 4 illustrates another example of the index table 212, and Table 5 illustrates another example of the L2P table L2P_Table(1), where Table 4 is an updated version of Table 1, and Table 5 is an updated version of Table 2. With regard to the logical address LBA(NL), the memory controller 110 may perform a re-write operation at a second time point which is later than the first time point, and may update the index table 212 and the L2P table L2P_Table(1) as indicated in Table 4 and Table 5, respectively, to correspond to the latest status of the usage of the NV memory 120, where the L2P-table index {B:5, P:3} has been changed to the L2P-table index {B:5, P:8} (as shown in the upper right corner of Table 4) and the mapping information {B:6, P:0} has been changed to the mapping information {B:6, P:5} (as shown in the upper right corner of Table 5). For example, the memory controller 110 may store the L2P table L2P_Table (1) in the physical page PAGE(8) of the physical block BLOCK(5) as indicated by the L2P-table index {B:5, P:8}.

Afterward, the host device 50 may send a read command to the memory device 100, to ask for the target data such as the data of the logical address LBA(NL). The host device 50 may also send the combination of the mapping information {B:6, P:0} and the L2P-table index {B:5, P:3} to the memory device 100. For the case that the corresponding internal mapping information such as that of this combination is incorrect, the memory controller 110 may utilize its own version of internal mapping information, such as the correct L2P-table index in the index table 212 (e.g. the L2P-table index {B:5, P:8}) and the local L2P address mapping table that is found through the correct L2P-table index in the index table 212 (e.g. the L2P table L2P_Table(1) that is found through the L2P-table index {B:5, P:8}). As a result, the memory controller 110 may obtain the correct version of the target data in the physical page PAGE(5) of the physical block BLOCK(6) as indicated by the mapping information {B:6, P:5}, rather than the old version of the target data in the physical page PAGE(0) of the physical block BLOCK(6) as indicated by the mapping information {B:6, P:0}.

According to some embodiments, the block and page indexes in any of the L2P-table indexes {B:5, P:3}, {B:5, P:4}, {B:5, P:5}, {B:5, P:6}, {B:5, P:7}, etc. of Table 1 may represent a physical address of the corresponding physical page of the corresponding physical block, but the present invention is not limited thereto. According to some embodiments, the block and page indexes in any of the mapping information {B:6, P:0}, {B:6, P:1}, {B:6, P:2}, {B:6, P:3}, {B:6, P:4}, etc. of Table 2 may represent a physical address of the corresponding physical page of the corresponding physical block, but the present invention is not limited thereto.

Figure 6:
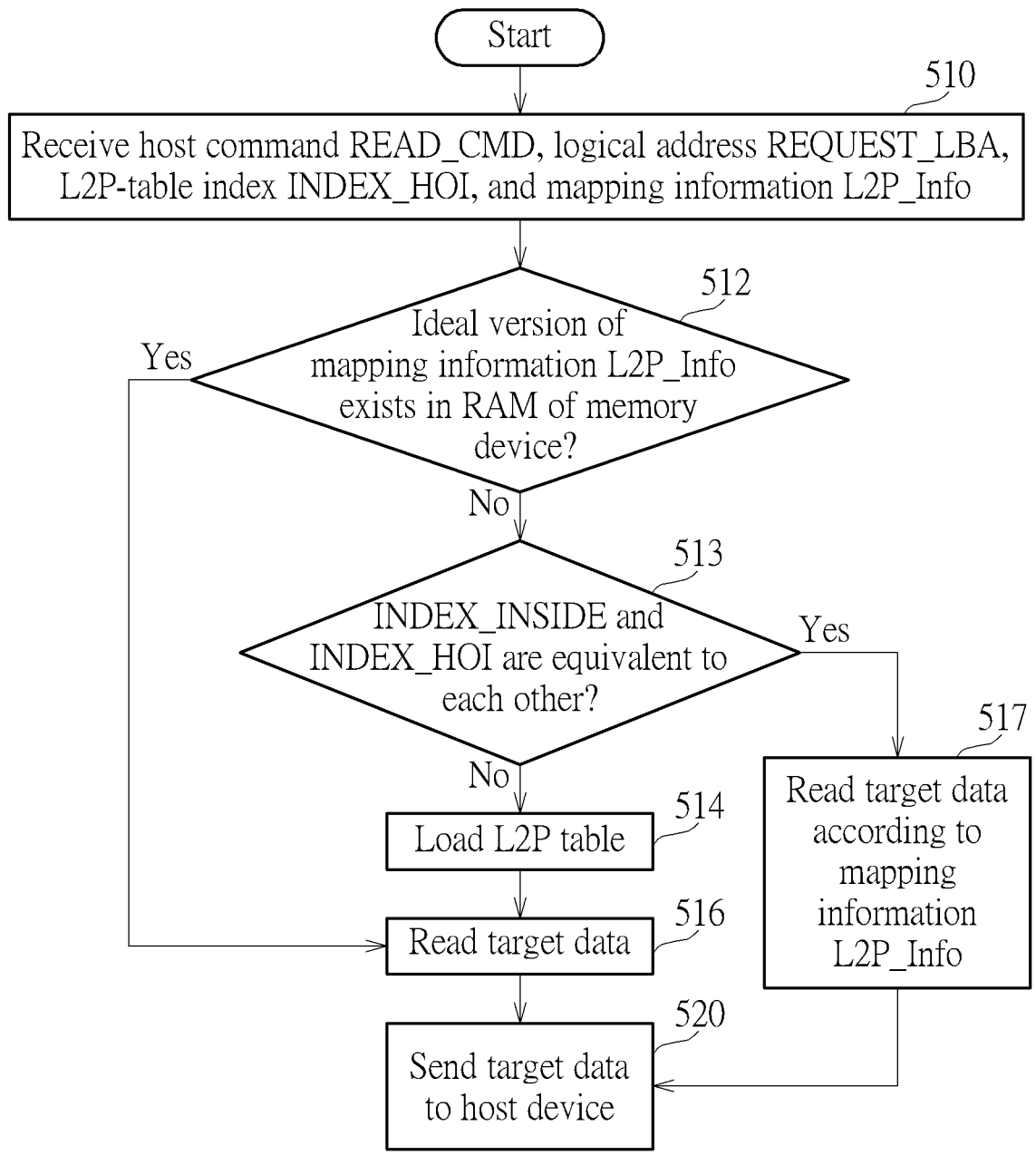
FIG. 6 illustrates a working flow of the method for performing access management in the memory device according to an embodiment of the present invention.

FIG. 6 illustrates a working flow of the method for performing access management in the memory device according to an embodiment of the present invention.

In Step 510, the memory device 100 may receive the host command READ_CMD, the associated logical address REQUEST_LBA, the L2P-table index INDEX_HOI, and the mapping information L2P_Info from the host device 50. According to this embodiment, the read command may be taken as an example of the host command READ_CMD, the logical address of the target data may be taken as an example of the logical address REQUEST_LBA, the L2P-table index sent by the host device 50 and stored in the HOI buffer 214 may be taken as an example of the L2P-table index INDEX_HOI, and the set of L2P address mapping information (e.g. the MI) of the target data, such as the set of L2P address mapping information (e.g. the MI) sent by the host device 50 and stored in the HOI buffer 214, may be taken as an example of the mapping information L2P_Info, but the present invention is not limited thereto. For example, when the host device 50 is operating abnormally, the mapping information L2P_Info may have been altered or may have become non-related to the target data. In another example, the host device 50 is operating normally, but the mapping information L2P_Info may have become out of date.

In Step 512, the memory controller 110 may check whether the ideal version of the mapping information L2P_Info (e.g. the MI shown in FIG. 3) exists in the RAM 116 of the memory device 100. This may be implemented according to one or more of the control schemes mentioned above (e.g. the dual-read control scheme shown in FIG. 3, the HOI checking control scheme shown in FIG. 4, and/or the RAM-sharing control scheme shown in FIG. 5), but the present invention is not limited thereto. According to this embodiment, the memory controller 110 may utilize its own version of internal mapping information, such as the set of L2P address mapping information (e.g. the MI) pointing toward the target data and available in the temporary local L2P address mapping table 211, as the ideal version of the mapping information L2P_Info, where the set of L2P address mapping information (e.g. the MI) can be obtained from the local L2P address mapping table that is found through the correct L2P-table index in the index table 212. When the ideal version of the mapping information L2P_Info exists in the RAM 116 of the memory device 100, Step 516 is entered; otherwise, Step 513 is entered.

In Step 513, the memory controller 110 may check whether the L2P-table index INDEX_INSIDE and the L2P-table index INDEX_HOI are equivalent to each other. According to this embodiment, the aforementioned correct L2P-table index in the index table 212 may be taken as an example of the L2P-table index INDEX_INSIDE. When the L2P-table index INDEX_INSIDE and the L2P-table index INDEX_HOI are equivalent to each other (which may indicate that the mapping information L2P_Info is correct), Step 517 is entered; otherwise (which may indicate that the mapping information L2P_Info is incorrect), Step 514 is entered.

In Step 514, the memory controller 110 may load the L2P table such as that read in the first read operation mentioned above. For example, in a situation where the mapping information L2P_Info has become out of date, the memory controller 110 may prevent using the mapping information L2P_Info as the reference for reading the target data.

In Step 516, the memory controller 110 may read the target data (e.g. the data read in the second read operation) from the physical page.

In Step 517, the memory controller 110 may read the target data (e.g. the data read in the single read operation) from the physical page according to the mapping information L2P_Info.

In Step 520, the memory controller 110 may send the target data to the host device 50. For example, no matter whether the mapping information L2P_Info has become out of date, the memory controller 110 can correctly read the target data and send out requested data (e.g. the target data) to the host device 50 as usual.

According to this embodiment, the combination of the host command READ_CMD and the logical address REQUEST_LBA mentioned in Step 510 may be directed to a request of accessing the target data corresponding to the logical address REQUEST_LBA from the NV memory 120. With regard to the request of accessing the target data corresponding to the logical address REQUEST_LBA from the NV memory 120, the memory controller 110 may perform at least one checking operation (e.g. one or more checking operations) such as that of Steps 512 and 513 to obtain at least one checking result such as that of Steps 512 and 513, for determining whether to load the L2P table mentioned in Step 514 from the NV memory 120 to the RAM 116, where the L2P table may comprise the address mapping information for accessing the target data, such as the set of L2P address mapping information (e.g. the MI). In addition, the checking result of Step 512 may indicate whether the ideal version of the mapping information L2P_Info exists in the RAM 116 or not. When Step 516 is entered based on this checking result, the memory controller 110 may read the target data from the NV memory 120 according to the ideal version of the mapping information L2P_Info in Step 516, where the latest version (e.g. a loaded version or an updated version) of the L2P table is available in the RAM 116 when reading the target data from the NV memory 120 is performed, and the ideal version of the mapping information L2P_Info (e.g. the MI shown in FIG. 3) is also available in the RAM 116. For example, before the checking operation of Step 512 is performed, the L2P table may have been loaded into the RAM 116 as the loaded version of the L2P table, so Step 516 may be entered, but the present invention is not limited thereto. Additionally, the checking result of Step 513 may indicate whether the L2P-table index INDEX_INSIDE and the L2P-table index INDEX_HOI are equivalent to each other or not. When Step 514 is entered based on this checking result, the memory controller 110 may load the L2P table into the RAM 116 as the loaded version of the L2P table in Step 514, and may read the target data from the NV memory 120 according to the loaded version of the L2P table in Step 516, where the latest version (e.g. the loaded version) of the L2P table is available in the RAM 116 when reading the target data from the NV memory 120 is performed, and the ideal version of the mapping information L2P_Info (e.g. the MI shown in FIG. 3) is also available in the RAM 116. When Step 517 is entered based on this checking result, the memory controller 110 may read the target data from the NV memory 120 according to the mapping information L2P_Info (e.g. the MI shown in FIG. 4) in Step 517, where the mapping information L2P_Info is available in the RAM 116. In some examples, the memory controller 110 may update the L2P table (e.g. the loaded version of the L2P table) to generate the updated version of the L2P table.

Regarding the HOI mentioned above, the memory controller 110 may send the set of internal mapping information of the memory device 100 toward the host device 50 as the HOI, for enhancing performance of the memory device 100, where the set of internal mapping information is related to mapping logical addresses to multiple physical addresses of the NV memory 120. This is typically performed in advance. After sending the set of internal mapping information of the memory device 100 toward the host device 50 as the HOI, the memory controller 110 may receive the host command READ_CMD, the logical address REQUEST_LBA, the L2P-table index INDEX_HOI, and the mapping information L2P_Info from the host device 50, where the mapping information L2P_Info is related to mapping the logical address REQUEST_LBA to a physical address of the NV memory 120. For example, the host device 50 may sends the L2P-table index INDEX_HOI and the mapping information L2P_Info toward the memory device 100 as additional information related to the request of accessing the target data corresponding to the logical address REQUEST_LBA from the NV memory 120. In addition, the mapping information L2P_Info may be received as at least one portion (e.g. a portion or all) of the HOI, and more particularly, may be received as the portion of the HOI regardless of the correctness of the mapping information L2P_Info, since the memory controller 110 can check the correctness of the mapping information L2P_Info through the operation of Step 513. The host device 50 may send the mapping information L2P_Info toward the memory device 100 for guiding the memory device 100 to access the target data according to the mapping information L2P_Info, but the memory device 100 (e.g. the memory controller 110) may reject the guidance when needed (e.g. in a situation where Step 514 is entered). For example, when the physical address is directed to the target data (which means the mapping information L2P_Info is correct), the L2P-table index INDEX_INSIDE and the L2P-table index INDEX_HOI are equivalent to each other, so Step 517 is entered. As a result, when the L2P-table index INDEX_INSIDE and the L2P-table index INDEX_HOI are equivalent to each other, the memory controller 110 skips loading the L2P table from the NV memory 120 to the RAM 116 of the memory device 100 and performs the operation of Step 517. In another example, when the physical address is not directed to the target data (which means the mapping information L2P_Info is incorrect), the L2P-table index INDEX_INSIDE and the L2P-table index INDEX_HOI are not equivalent to each other, so Step 514 is entered. As a result, when the L2P-table index INDEX_INSIDE and the L2P-table index INDEX_HOI are not equivalent to each other, the memory controller 110 loads the L2P table from the NV memory 120 to the RAM 116 of the memory device 100 in Step 514. With aid of the checking result of Step 513, the memory controller 110 that controls the operations of the memory device 100 according to the present invention method can guarantee that the memory device 100 can operate properly in various situations, respectively, where various goals such as optimal performance, high security, budget control, etc. can be achieved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access management in a memory device, the memory device comprising a non-volatile (NV) memory, the NV memory comprising at least one NV memory element, the method comprising:

sending a plurality of sets of logical-to-physical (L2P) mapping information and corresponding L2P-table index of the memory device to a host device;

receiving a read command carrying a logical address and one set of L2P mapping information and corresponding L2P-table index among the plurality of sets of L2P mapping information and corresponding L2P-table index, from the host device, wherein the read command is directed to a request of accessing target data corresponding to the logical address carried by the read command from the NV memory; and using the said one set of L2P mapping information and corresponding L2P-table index to read the target data from the NV memory and sending the target data to the host device.

2. The method of claim 1, wherein the corresponding L2P-table index is a second L2P-table index, and the method further comprises:

with regard to the request of accessing the target data corresponding to the logical address carried by the read command from the NV memory, according to at least one checking result, determining whether to load a first L2P table among multiple L2P tables from the NV memory to a random access memory (RAM) of the memory device, wherein the first L2P table comprises said one set of L2P mapping information for accessing the target data, and the at least one checking result indicates whether a first L2P-table index stored in the RAM and pointing toward the first L2P table and the second L2P-table index carried by the read command sent from the host device are equivalent to each other; and in response to the at least one checking result indicating that the first L2P-table index and the second L2P-table index are not equivalent to each other, loading the first L2P table from the NV memory to the RAM, and using the first L2P table to read the target data from the NV memory.

3. The method of claim 2, wherein the read command and the logical address carried by the read command represent a first read command and a first logical address carried by the first read command, respectively, and the one set of L2P mapping information and corresponding L2P-table index carried by the read command sent from the host device is related to mapping the first logical address to a first physical address of the NV memory; and when the first physical address is directed to the target data, the first L2P-table index and the second L2P-table index are equivalent to each other.

4. The method of claim 1, wherein the step of sending the plurality of sets of L2P mapping information and corresponding L2P-table index of the memory device to the host device further comprises:

sending at least one set of internal mapping information of the memory device toward the host device as host-owned information (HOI), wherein the at least one set of internal mapping information comprises the plurality of sets of L2P mapping information and corresponding L2P-table index of the memory device;

wherein the step of receiving a read command carrying a logical address and one set of L2P mapping information and corresponding L2P-table index among the plurality of sets of L2P mapping information and corresponding L2P-table index, from the host device further comprises:

after sending the at least one set of internal mapping information of the memory device toward the host device as the HOI, receiving the read command carrying the one set of L2P mapping information and corresponding L2P-table index among the plurality of sets of L2P mapping information and corresponding L2P-table index and the logical address.

5. The method of claim 4, wherein the one set of L2P mapping information and corresponding L2P-table index is received as at least one portion of the HOI.

6. A memory device, comprising:
a non-volatile (NV) memory, arranged to store information, wherein the NV memory comprises at least one NV memory element; and
a controller, coupled to the NV memory, arranged to control operations of the memory device, wherein the controller comprises:
a processing circuit, arranged to control the controller according to a plurality of host commands from a host device, to allow the host device to access the NV memory through the controller, wherein:
the controller sends a plurality of sets of logical-to-physical (L2P) mapping information and corresponding L2P-table index of the memory device to the host device;
the controller receives a read command carrying a logical address and one set of L2P mapping information and corresponding L2P-table index among the plurality of sets of L2P mapping information and corresponding L2P-table index, from the host device, wherein the read command is directed to a request of accessing target data corresponding to the logical address carried by the read command from the NV memory; and the controller uses the said one set of L2P mapping information and corresponding L2P-table index to read the target data from the NV memory and sends the target data to the host device.

7. The memory device of claim 6, wherein the corresponding L2P-table index is a second L2P-table index, and:
with regard to the request of accessing the target data corresponding to the logical address carried by the read command from the NV memory, according to at least one checking result, the controller determines whether to load a first L2P table among multiple L2P tables from the NV memory to a random access memory (RAM) of the memory device, wherein the first L2P table comprises said one set of L2P mapping information for accessing the target data, and the at least one checking result indicates whether a first L2P-table index stored in the RAM and pointing toward the first L2P table and the second L2P-table index carried by the read command sent from the host device are equivalent to each other; and
in response to the at least one checking result indicating that the first L2P-table index and the second L2P-table index are not equivalent to each other, the controller loads the first L2P table from the NV memory to the RAM,
and uses the first L2P table to read the target data from the NV memory.

8. The memory device of claim 7, wherein the read command and the logical address carried by the read command represent a first read command and a first logical address carried by the first read command, respectively, and the one set of L2P mapping information and corresponding L2P-table index carried by the read command sent from the host device is related to mapping the first logical address to a first physical address of the NV memory; and when the first physical address is directed to the target data, the first L2P-table index and the second L2P-table index are equivalent to each other.

9. A controller of a memory device, the memory device comprising the controller and a non-volatile (NV) memory, the NV memory comprising at least one NV memory element, the controller comprising:
a processing circuit, arranged to control the controller according to a plurality of host commands from a host device, to allow the host device to access the NV memory through the controller, wherein:
the controller sends a plurality of sets of logical-to-physical (L2P) mapping information and corresponding L2P-table index of the memory device to the host device;
the controller receives a read command carrying a logical address and one set of L2P mapping information and corresponding L2P-table index among the plurality of sets of L2P mapping information and corresponding L2P-table index, from the host device, wherein the read command is directed to a request of accessing target data corresponding to the logical address carried by the read command from the NV memory; and
the controller uses the said one set of L2P mapping information and corresponding L2P-table index to read the target data from the NV memory and sends the target data to the host device.

10. The controller of claim 9, wherein the corresponding L2P-table index is a second L2P-table index, and:
with regard to the request of accessing the target data corresponding to the logical address carried by the read command from the NV memory, according to at least one checking result, the controller determines whether to load a first L2P table among multiple L2P tables from the NV memory to a random access memory (RAM) of the memory device, wherein the first L2P table comprises said one set of L2P mapping information for accessing the target data, and the at least one checking result indicates whether a first L2P-table index stored in the RAM and pointing toward the first L2P table and the second L2P-table index carried by the read command sent from the host device are equivalent to each other; and
in response to the at least one checking result indicating that the first L2P-table index and the second L2P-table index are not equivalent to each other, the controller loads the first L2P table from the NV memory to the RAM, and uses the first L2P table to read the target data from the NV memory.

11. The controller of claim 10, wherein the read command and the logical address carried by the read command represent a first read command and a first logical address carried by the first read command, respectively, and the one set of L2P mapping information and corresponding L2P-table index carried by the read command sent from the host device is related to mapping the first logical address to a first physical address of the NV memory; and when the first physical address is directed to the target data, the first L2P-table index and the second L2P-table index are equivalent to each other.

* * * * *